A. H. FOX.
SHOCK ABSORBER FOR AUTOMOBILES.
APPLICATION FILED DEC. 18, 1913.
1,151,350.
Patented Aug. 24, 1915.
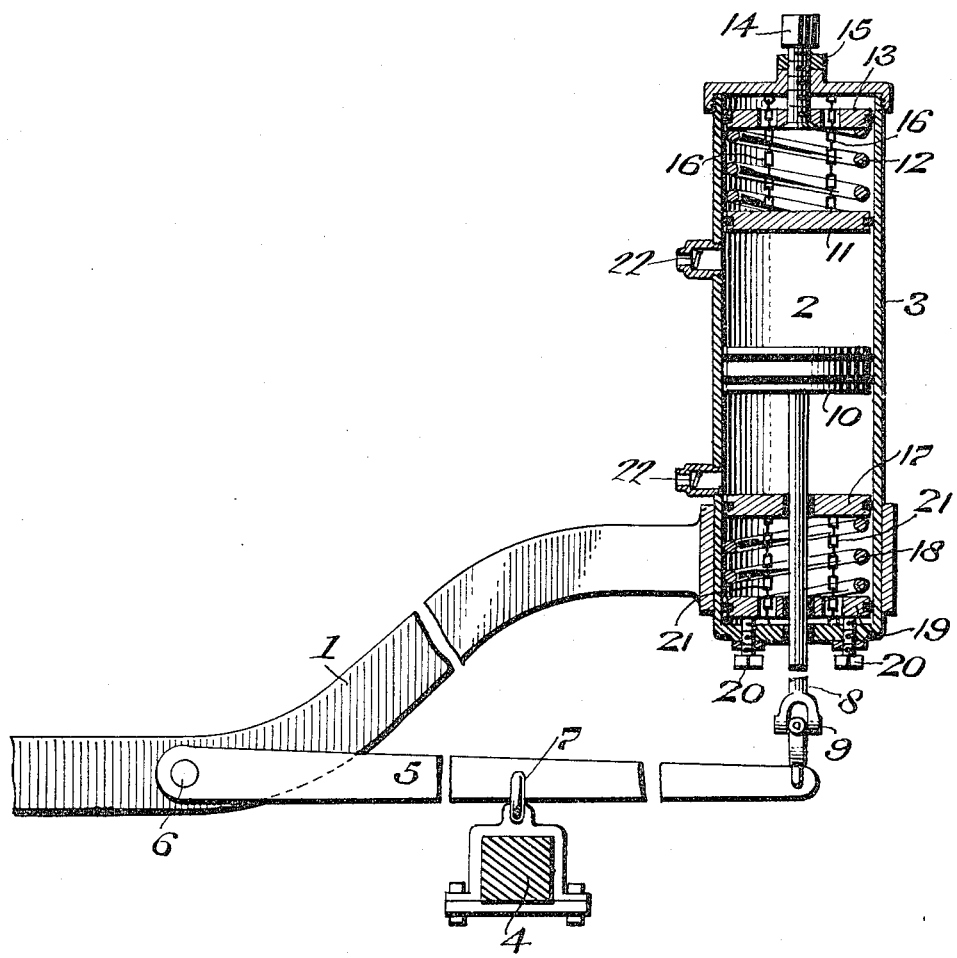
WITNESSES
P. F. Nagle
H. G. Dieterich
INVENTOR
Ansley H. Fox.
BY Wiedersheim & Fairbanks
ATTORNEYS

UNITED STATES PATENT OFFICE.

ANSLEY H. FOX, OF PHILADELPHIA, PENNSYLVANIA, ASSIGNOR, BY MESNE ASSIGNMENTS, TO FOX PNEUMATIC SHOCK-ABSORBER CO., OF PHILADELPHIA, PENNSYLVANIA, A CORPORATION OF DELAWARE.

SHOCK-ABSORBER FOR AUTOMOBILES.

1,151,350.      Specification of Letters Patent.      Patented Aug. 24, 1915.

Application filed December 18, 1913. Serial No. 807,399.

*To all whom it may concern:*

Be it known that I, ANSLEY H. FOX, a citizen of the United States, residing in the city and county of Philadelphia, State of Pennsylvania, have invented a new and useful Shock-Absorber for Automobiles, of which the following is a specification.

My invention relates to a new and useful improvement in shock absorbers for vehicles, and consists in providing compression members, between which air is compressed, and means for automatically regulating the distance between said compression members at a predetermined pressure, to provide for a greater play between said compression members and to allow for an increase of compression therebetween.

It further consists of a movable abutment or compression member, and means for holding the same in one position and permitting movement thereof at a predetermined pressure.

It further consists of means for adjusting the holding means, whereby the degree of pressure, at which movement occurs, may be varied.

It further consists of other novel features of construction, all as will be hereinafter fully set forth.

The annexed drawing and the following description set forth in detail one mechanical form embodying the invention, such detail construction being but one of various mechanical forms in which the principle of the invention may be used.

The figure represents a sectional view of a shock absorber embodying my invention, showing a portion of a body of a vehicle and an axle in section.

Referring to the drawing:—As above stated, it will be understood that the drawing represents one embodiment of my invention, which is sufficient to illustrate the principle and operation thereof, it being understood that the parts are to be suitably proportioned in order to accomplish the desired results, and are to be suitably mounted in proper relation to each other, in order to operate satisfactorily.

In the drawing, 1 designates a portion of the body or chassis of a vehicle, such as an automobile, to which is suitably secured in any desired manner and at a suitable point, a compression chamber 2, here shown as formed of a cylinder or tank 3.

4 designates the axle of the vehicle, as for example, the rear axle, upon which is suitably mounted and connected the chassis or body 1.

5 designates a lever pivotally secured at one end, as at 6, to the body or chassis 1, and which is also connected in any suitable manner, as by a shackle 7, with the axle 4, in such a manner that a certain amount of lateral and longitudinal movements between the lever and the axle is permitted. To the end of the lever, opposite to that which is pivoted to the body 1, is suitably connected a piston rod 8, as here shown it is connected by means of a universal joint 9, and it will be understood that the parts are so related that the end of the lever to which the piston rod 8 is connected will move approximately twice as much as the axle itself moves relative to the body of the car, in order that sufficient compression of the air in the compression chamber 2 will be provided, to accomplish satisfactory cushioning results, since it will be understood that the ordinary movement of the axle of a car is not great enough in itself to give sufficient pressure, and I desire to mount the lever and axle in such a manner that sufficient amount of movement will be given to the piston rod 8, in order to accomplish the desired results.

10 designates a piston in the compression chamber 2, which is in suitable connection with the piston rod 8, and this piston serves in the present instance as one of the compression members in said chamber.

11 designates another compression member therein, which may be termed a movable abutment, and between the compression member 11 and the piston or compression member 10, the air is compressed by movement of the piston or compression member 10 to provide for the cushioning action. It has been found that whenever a small shock is encountered and a short movement of the compression members occurs, in order to take up the same and suitably compress the air to provide the cushioning results, it is necessary to do so between two compression points that are not very far removed or distant from each other, but that when a greater shock occurs, the two compression points are too close together to permit the greater movement necessary between the compression members, while in a construction where the two compression points are far enough removed from each other to allow for the greater shocks and the greater movement of the compression members, there will not be sufficient compression of the air therebetween on the smaller shocks, to provide the proper cushioning action therefor. By providing the movable compression member or abutment 11 and holding the same normally in one position, as that illustrated, the air compressed between the two members 10 and 11 will be sufficient to take up the small shocks. When heavy or large shocks occur, and it is necessary to provide for an increased compression between the members, as well as to permit greater movement between the compression member, I have movably mounted the member 11 in such a manner, that while it will be normally held in one position up to a predetermined degree of compression, after the pressure of the air thereagainst reaches a certain degree, it will cause the same to move automatically away from its former position, thus providing for increased compression, as well as for greater play of the said piston or compression member 10.

As here shown, I have provided a spring or other resilient device 12, which bears against the compression member 11 to hold the same normally in one position as that illustrated, and the tension of which spring is overcome by the increased pressure of the air under great shocks, in order to allow the said compression member 11 to move, as previously described. In order to adjust the tension of said spring to vary the degree of pressure at which the member moves, I have here shown a plate 13, bearing against the spring 12, and which plate is adjustable by means of a screw 14, which can vary the position of the said plate 13, and a lock nut 15 can be utilized to lock the said plate 13 in its adjusted positions.

In order to prevent the improper movement of the compression member 11, I have provided suitable means, such as chains 16, which are connected with the casing of the compression chamber 2 for this purpose.

A similar construction to that just described is provided at the opposite end of the compression chamber 2, in order to provide for the rebound and to take up the same. In this structure, I have provided a compression member or movable abutment 17, having a spring 18 bearing upwardly against the same, and with a plate 19 adjustable by means of the set screws 20 for varying the tension of the spring 18, and I have provided means, such as the chains 21 for limiting the upward movement of said plate 17, as will be evident.

The operation of the device will be readily apparent. As the wheels of the vehicle encounter obstacles or inequalities, it will be understood that certain movement between the axle and the body 1 occurs, which movement is imparted to the lever 5, and moves the piston or compression member 10. Supposing, for example, that the tension upon the spring has been adjusted in order that the compression member or movable abutment 11 will be held in the one position up to a pressure of 100 pounds, it will be understood that as the piston moves toward the compression member 11, the air therebetween will be compressed, thus taking up the small shocks, as previously described, but when the shock is considerably greater and greater compression is required, as where the pressure will exceed the 100 pounds, the air against the movable abutment or compression member 11 will move the same away from the piston against the tension of the spring 13, whereby greater play between the compression members is permitted, and increased compression between the member is provided, the same action occurring upon the rebound, as will be evident.

From the above it will be understood that I have provided means for taking care of both the ordinary and the extra ordinary road shocks, and that the air cushioning will be satisfactory for both, and that by means of compressing the air between the two points not far distant, it will take care of the small shocks, while the increased distance will provide for the great shocks. Any suitable means for supplying air to the compression chamber 2 may be provided, and as here shown, I provide valves 22 for this purpose, a suitable amount of air being drawn in to keep the proper amount of air within the chamber. This is a considerable advantage over that where it is necessary to fill a tank with compressed air, since it has been found in practice, that a very little wear will cause the joints of the cylinder or tank to leak, and the compressed air thus escapes. It will be understood that the necessary parts are all suitably provided with packing or suitable means for providing for the proper operation of the device.

Other modes of applying the principle of my invention may be employed for the mode herein explained. Change may therefore be made as regards the mechanism thus disclosed, provided the principles of construction set forth respectively in the following claims are employed.

Having thus described my invention, what I claim as new and desire to secure by Letters Patent, is:—

1. In a shock absorber for a vehicle, a compression chamber, a compression member therein, a rigid arm suitably secured to the axle of the vehicle and pivotally connected with the frame of the vehicle on one side of the axle connection and with the compression member on the opposite side of the axle connection, to impart movement to said member of greater degree than the extent of movement between the frame and axle, and movable compression abutments in said chamber opposed to said member, on opposite sides thereof, each normally held in one position and each adapted to be moved at a predetermined pressure to permit greater play between said compression members and to allow for an increased compression between each abutment and said member.

2. In a shock absorber for vehicles, a frame a cylinder suitably supported thereon, a piston therein, a rigid lever suitably secured to the axle of said vehicle, said lever being pivotally connected with the body of the vehicle on one side of said axle-connection, and being in suitable connection with said piston upon the opposite side of said axle-connection, and a movable compression abutment in said cylinder adapted for yielding movement at a predetermined degree of air compression.

3. The combination with the frame and axle of a vehicle, of a cushion device comprising relatively movable members, one of said members having an air cushion on each side thereof, a movable compression abutment suitably carried by one of said members and adapted for yielding movement at a predetermined degree of air compression, and a non-flexing arm connected with said frame and axle and having a pivotal connection with one of said members, the point of connection of said arm with said axle being intermediate the other two points of connection and closer to said frame connection, to impart movement to said member, of greater degree than the extent of movement between said frame and axle, whereby the proper amount of cushioning action of said air cushions against said member will be interposed between said frame and axle.

4. A cushion device comprising relative movable members, one of said members having an air cushion on each side thereof, a movable compression abutment suitably carried by one of said members and adapted for yielding movement at a predetermined degree of air compression, and means, in suitable connection with the frame and axle of said vehicle to be moved by relative movement of such frame and axle and to one of said members to impart a comparatively greater movement to such member from the movement of said frame and axle.

ANSLEY H. FOX.

Witnesses:
C. D. McVay,
M. E. Byrne.

Copies of this patent may be obtained for five cents each, by addressing the "Commissioner of Patents, Washington, D. C."